(12) United States Patent
Suzuki et al.

(10) Patent No.: US 8,290,041 B2
(45) Date of Patent: Oct. 16, 2012

(54) COMMUNICATION TERMINAL

(75) Inventors: Shingo Suzuki, Tokyo (JP); Yoshihiro Kikuchi, Tokyo (JP); Yuji Kawashima, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1465 days.

(21) Appl. No.: 11/825,641

(22) Filed: Jul. 5, 2007

(65) Prior Publication Data

US 2008/0008240 A1    Jan. 10, 2008

(30) Foreign Application Priority Data

Jul. 6, 2006   (JP) ................................. 2006-187124

(51) Int. Cl.
*H04N 7/12* (2006.01)

(52) U.S. Cl. ............................... 375/240.13; 375/240.12

(58) Field of Classification Search ............. 375/240.13, 375/240.12
See application file for complete search history.

(56) References Cited

U.S. PATENT DOCUMENTS

| | | | | |
|---|---|---|---|---|
| 4,217,609 A | * | 8/1980 | Hatori et al. | 375/240.13 |
| 5,272,529 A | * | 12/1993 | Frederiksen | 375/240.22 |
| 5,386,234 A | * | 1/1995 | Veltman et al. | 375/240.13 |
| 5,418,569 A | * | 5/1995 | Ando | 375/240.04 |
| 5,537,147 A | * | 7/1996 | Tahara | 348/400.1 |
| 5,818,970 A | * | 10/1998 | Ishikawa et al. | 382/248 |
| 6,040,865 A | * | 3/2000 | Kato et al. | 375/240.16 |
| 6,894,628 B2 | * | 5/2005 | Marpe et al. | 341/107 |
| 7,111,045 B2 | * | 9/2006 | Kato et al. | 709/205 |
| 7,242,713 B2 | * | 7/2007 | Srinivasan et al. | 375/240.01 |
| 7,889,795 B2 | * | 2/2011 | Ha | 375/240.17 |
| 2003/0235249 A1 | * | 12/2003 | Zhao et al. | 375/240.13 |
| 2004/0218672 A1 | * | 11/2004 | Bourne et al. | 375/240.12 |
| 2004/0252768 A1 | * | 12/2004 | Suzuki et al. | 375/240.24 |

FOREIGN PATENT DOCUMENTS

| | | |
|---|---|---|
| JP | 10-51785 A | 2/1998 |
| JP | 10-210480 A | 8/1998 |
| JP | 2006-94081 A | 4/2006 |
| JP | 2008017225 A * | 1/2008 |

OTHER PUBLICATIONS

H.264, Advanced Video Coding, Nov. 2007.*
Espacenet result, Espacenet Result List, Jul. 14, 2011.*
Japanese Office Action dated Nov. 11, 2010 (and English translation thereof) in counterpart Japanese Application No. 2006-187124.
G.Y. Kim et al; An Early Detection of All-Zero DCT Blocks in H.264; 2004 IEEE; pp. 453-456.

* cited by examiner

*Primary Examiner* — Jung Kim
*Assistant Examiner* — Shan Elahi
(74) *Attorney, Agent, or Firm* — Holtz, Holtz, Goodman & Chick, PC

(57) ABSTRACT

A communication terminal performs a discrete cosine transform and a quantization process in accordance with a selected coding mode so as to reduce loads caused by these processings and suppress degradation of picture quality. When performing coding of a moving picture inputted through a picture input part, a control part determines which coding mode among 4×4 intra prediction coding on a luminance signal, 16×16 intra prediction coding, intra prediction coding on a color-differential signal, and inter prediction coding is performed. In accordance with the selected coding mode, and in view of a predictive error, the processing content in the discrete cosine transform and the quantization process is switched.

20 Claims, 6 Drawing Sheets

COMMUNICATION TERMINAL

CROSS-REFERENCE TO RELATED APPLICATION

This application is based on and claims the benefit of priority from the prior Japanese Patent Application No. 2006-187124, filed on Jul. 6, 2006, the entire contents of which are incorporated herein by reference.

BACKGROUND OF THE INVENTION

1. Field of the Invention

The present invention relates to a communication terminal for coding a moving picture, and particularly to a communication terminal provided with a function of reducing loads of a discrete cosine transform and a quantization processing without degradation of picture quality.

2. Description of the Related Art

Coding of a moving picture is executed such that an inputted picture is separated into individual frames, and each frame is divided into macro blocks (MB) each including, for example, a rectangular region of 8 pixels×8 pixels. Various processings, such as discrete cosine transform (DCT), quantization, and Huffman coding, are performed on the MBs.

In coding a moving picture in this manner, the processing loads of the DCT and the quantization processing are very large. For this reason, various techniques to reduce the processing load have been considered.

For example, Jpn. Pat. Appln. KOKAI Publication No. 10-210480 discloses a technique in which when a picture signal is divided into blocks and coding is performed, an evaluation value of a predictive residual signal is obtained for each of the blocks, and it is judged that the block is an effective block when this evaluation value is equal to or greater than a threshold, while the block is judged to be an ineffective block when this evaluation value is less than the threshold, and predictive error information is not sent to the block judged to be ineffective.

By using this technique disclosed in Jpn. Pat. Appln. KOKAI Publication No. 10-210480, in a case where all coefficients obtained as a result of the quantization processing become zero, the DCT and the quantization processing can be omitted.

In recent years, a technique to code moving pictures called H.264 has been standardized. In this H.264 standard, since there are a plurality of coding modes, a situation arises in which the feature of a predictive error varies according to a selected coding mode. Thus, there is a concern that when a uniform method of reducing an amount of processing is applied to all coding modes, degradation of picture quality is caused.

BRIEF SUMMARY OF THE INVENTION

The present invention has been made to solve this problem, and it is an object of the present invention to control a discrete cosine transform and a quantization processing according to a selected coding mode, so that loads caused by these processings are reduced and degradation of picture quality is suppressed.

In order to achieve this object, according to one aspect of the present invention, in a communication terminal including a coding part to code a moving picture by selectively performing an intra predictive coding processing and an inter predictive coding processing, in a case where the intra predictive coding processing is executed by the coding part, a difference picture is created by calculating a difference between a block of a first size as a coding object and a predictive picture block of the first size created from a block adjacent to the block that is the coding object. The difference picture is divided into blocks of a second size smaller than the first size, and a predictive error is calculated from the divided difference picture. The predictive error is compared with a previously set threshold, and as a result of this comparison, if the predictive error exceeds the threshold, a discrete cosine transform is performed on the difference picture, and a quantization processing is performed on an alternating current component obtained by this discrete cosine transform. On the other hand, if the predictive error is equal to or less than the threshold, the discrete cosine transform is performed to obtain only a direct current component is performed, and a first processing is performed to set the alternating current component to zero is performed, and after the first processing is performed, a second processing is performed to perform an orthogonal transform and the quantization processing on the direct current component.

According to the present invention, a communication terminal with a coding function for coding a moving picture can be provided in which the discrete cosine transform and the quantization processing are controlled according to the selected coding mode, so that the loads of the discrete cosine transform and the quantization processing can be reduced without degradation of picture quality.

DETAILED DESCRIPTION OF THE INVENTION

Hereinafter, an embodiment of the invention will be described with reference to the drawings.

Figure 1:
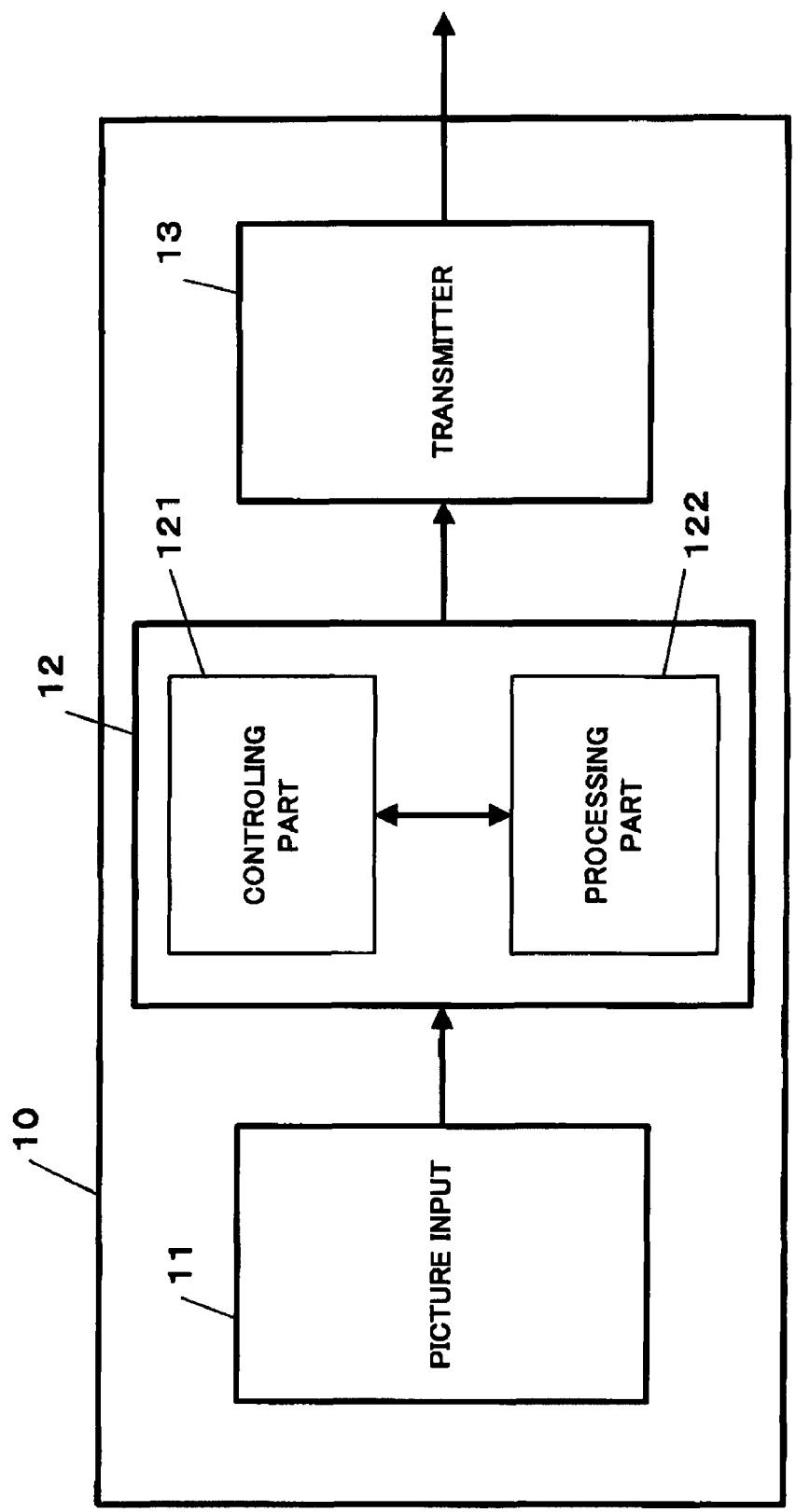
FIG. 1 shows a structure of a communication terminal provided with a coding function for coding a moving picture.

FIG. 1 shows an exemplary structure of a communication terminal 10 which has a function to execute a moving picture coding process according to the present invention. The communication terminal 10 is, for example, a cellular phone, a personal computer, or the like. If the communication terminal 10 is a cellular phone or a personal computer, the communication terminal 10 includes a display, a key input unit and the like in addition to the structure shown in FIG. 1. However, since these features are not necessary for the description of the invention, they are not shown in FIG. 1.

In FIG. 1, the communication terminal 10 includes a picture input part 11 such as a camera, a coding part 12 to perform a moving picture coding process on the moving picture inputted from the picture input part 11, and a transmission part 13 to transmit the coded moving picture, which has been coded by the coding part 12, to a network, a storage, or the like. The coding part 12 includes a control part 121 to control a coding process, and a processing part 122 to perform the coding process for the inputted moving picture in accordance with the control of the control part 121.

Figure 2:
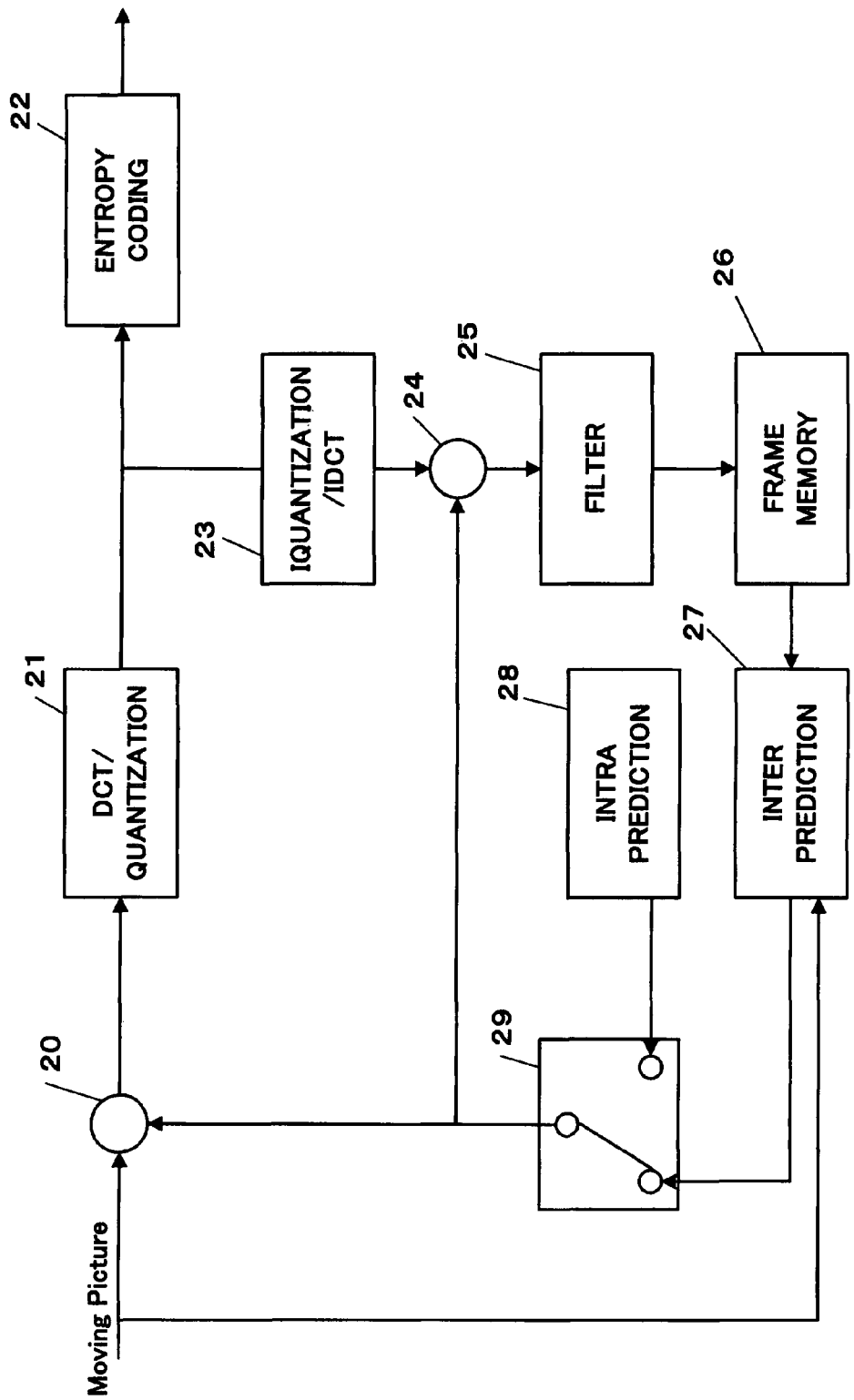
FIG. 2 is a block diagram showing a structure for coding a moving picture.

As shown in FIG. 2, which is a block diagram showing an exemplary structure of the processing part 122, the processing part 122 includes a subtracting part 20, a DCT (Discrete Cosine Transform)/quantization part 21, an entropy coding part 22, an inverse quantization/inverse DCT part 23, an adding part 24, a deblocking filter 25, a frame memory 26, an inter prediction part 27, an intra prediction part 28, and a switching part 29.

The subtracting part 20 performs an operation to obtain a difference signal between a predictive signal outputted from the switching part 29 and a picture frame signal obtained from a moving picture inputted through the picture input part 11 by subtracting the predictive signal from the picture frame signal. The obtained difference is outputted as a difference signal for subsequent processing.

The DCT/quantization part 21 performs a DCT processing on the difference signal outputted from the subtracting part 20 to obtain DCT coefficients, and quantizes the DCT coefficients to obtain quantized coefficients.

The entropy coding part 22 performs an entropy coding processing on the quantized coefficients outputted from the DCT/quantization part 21. As the entropy coding, for example, a context adaptive variable length coding principle, or a context adaptive binary arithmetic coding principle is used.

Also, the quantized coefficients outputted from the DCT/quantization part 21 are inputted to the inverse quantization/inverse DCT part 23. In the inverse quantization/inverse DCT part 23, inverse quantization processing is performed on the inputted quantized coefficients to restore the DCT coefficients, and an inverse DCT processing is performed on the DCT coefficients to restore the difference signal.

The adding part 24 uses the difference signal outputted from the inverse quantization/inverse DCT part 23 and the same predictive signal as inputted to the subtracting part 20 by the switching part 29, and restores the picture frame signal. The restored picture frame signal is stored in the frame memory 26 via the deblocking filter 25, and is used for subsequent inter prediction.

The deblocking filter 25 performs a deblocking process on the restored picture frame signal output from the adding part 24, and performs a process to reduce distortion that has occurred between the blocks that serve as units of the coding process.

The inter prediction part 27 obtains an inter prediction evaluation value representing compression efficiency in inter prediction. The inter prediction evaluation value is calculated from the input signal (picture frame signal) from the input part 11 and the recovered past picture frame signal stored in the frame memory 26. The inter prediction part 27 also outputs, as an inter prediction signal, a partial picture frame signal extracted from the picture frame signal stored in the frame memory 26.

The intra prediction part 28 compresses a picture frame signal by using a correlation between blocks constituting the inputted one picture frame signal, and outputs an intra prediction signal obtained from a block to be coded and a block adjacent to the block to be coded, and an intra prediction evaluation value representing compression efficiency in this intra prediction.

In accordance with an instruction from the control part 121, the switching part 29 selects one of the inter coding and the intra coding to be used for coding the block divided from the picture frame signal as the input signal.

In the intra coding of H.264/AVC, there are three types of coding modes, that is, 4×4 intra prediction coding to perform coding on a luminance signal in 4×4 pixel units, 16×16 intra prediction coding to perform coding on the luminance signal in 16×16 pixel units, and intra prediction coding on a color-differential signal. Thus, counting the inter coding as well, there are four coding processes (coding modes) in total.

According to the present invention, in accordance with each of the coding modes, the discrete cosine transform and the quantization process are adaptively controlled, so that the loads of these processes are reduced without degradation of picture quality. Hereinafter, the discrete cosine transform and the quantization process executed according to the invention by the processing part 122 controlled by the control part 121 will be described.

First, the control part 121 performs a judgment to identify a coding mode. Then the control part 121 determines the content of the discrete cosine transform and the quantization according to the result of the judgment of the coding mode, which corresponds to one of: the inter prediction coding mode; the intra 4×4 prediction coding mode on the luminance; the intra 16×16 prediction coding mode on the luminance; and the intra prediction coding mode on the color difference, and the control part 121 issues an instruction to the processing part 122.

First, the case where the control part 121 has selected the inter prediction coding mode will be described with reference to FIG. 3.

Figure 3:
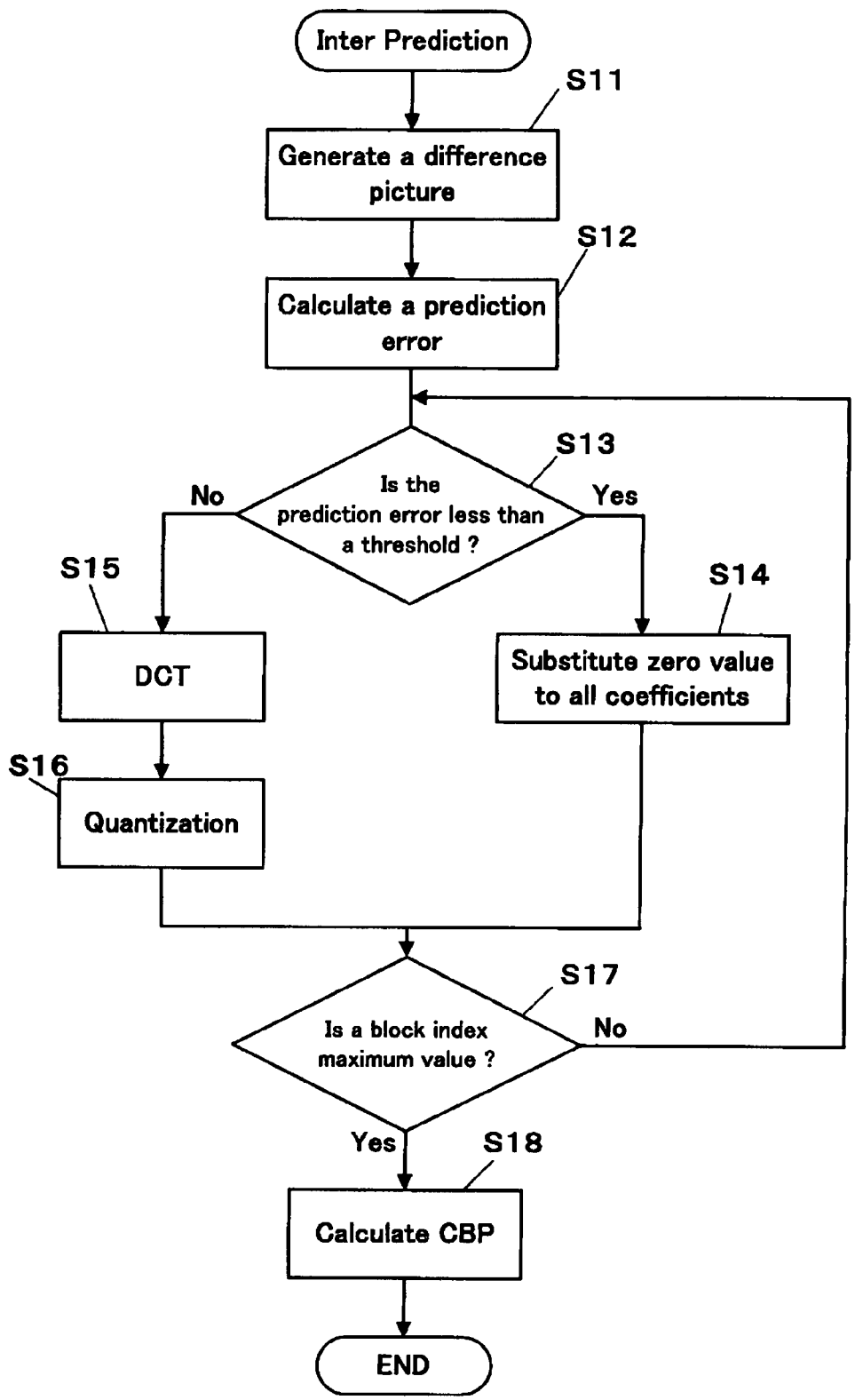
FIG. 3 shows an inter prediction processing according to the present invention.

As shown in FIG. 3, when the inter prediction coding mode is selected, the subtracting part 20 is controlled by the control part 121, and receives the inter prediction signal outputted from the inter prediction part 27 through the switching part 29 and the signal obtained by dividing the input signal to obtain a difference signal by subtracting the inter prediction signal from the signal obtained by dividing the input signal, and generates a difference picture (S11). When this difference picture is obtained, the control part 121 calculates an SAD (Sum of Absolute Difference) value representing a prediction error for each block including 4×4 pixels from the difference picture (S12).

Subsequently, when the calculation of the SAD value is ended, that is, when the prediction error is obtained, the control part 121 compares this prediction error with a predetermined threshold, and performs a judgment as to whether or not the prediction error is less than the threshold (S13). As a result of this judgment, in the case where the prediction error is less than the threshold, the DCT/quantization part 21 is controlled and zero values are substituted for all quantized coefficients (S14).

When the substitution process of the zero values is completed, the control part 121 checks whether or not a block index corresponding to the block on which the processing has been performed indicates a maximum value (S17), and in the case where the index indicates the maximum value, a CBP (coded_block_pattern) value is calculated for each block including 8×8 pixels, that is, for each block including four blocks each of which is the calculation object of the SAD value and includes 4×4 pixels (S18), and the inter prediction coding is ended.

Incidentally, the CBP value is information indicating whether or not there is a coefficient of an alternating current (AC) component of the quantized coefficient obtained by the quantization process, and/or a coefficient of a direct current (DC) component. When the CBP value is 0, it indicates that there is no coefficient in both the AC and DC components; when the CBP value is 1, it indicates that there is only the coefficient of the DC component; and when the CBP value is 2, it indicates that there is only the coefficient of the AC component or that there are coefficients of both the AC and DC components.

On the other hand, in the case where the block index is not the maximum value, process returns to S13, and the processes according to steps S13-S17 are repeated for a next block including 4×4 pixels until the block index reaches the maximum value.

At step S13, if the predictive error is equal to or exceeds the threshold, the control part 121 controls the DCT/quantization part 21 and causes the DCT process with integer precision to be performed in a unit of a block including 4×4 pixels (S15), and further causes the quantization process to be performed on the coefficient obtained by the DCT process with integer precision (S16).

Thereafter, as described above, the confirmation as to whether or not the block index indicates the maximum value (S17), and the calculation of the CBP (S18) are performed. When the above process is completed, the quantized coefficient outputted from the DCT/quantization part 21 is subjected to a variable length coding by the entropy coding part 22, and is outputted to the network or the like through the transmission part 13.

Next, the case where the control part 121 has selected the intra 4×4 prediction coding mode will be described with reference to FIG. 4.

Figure 4:
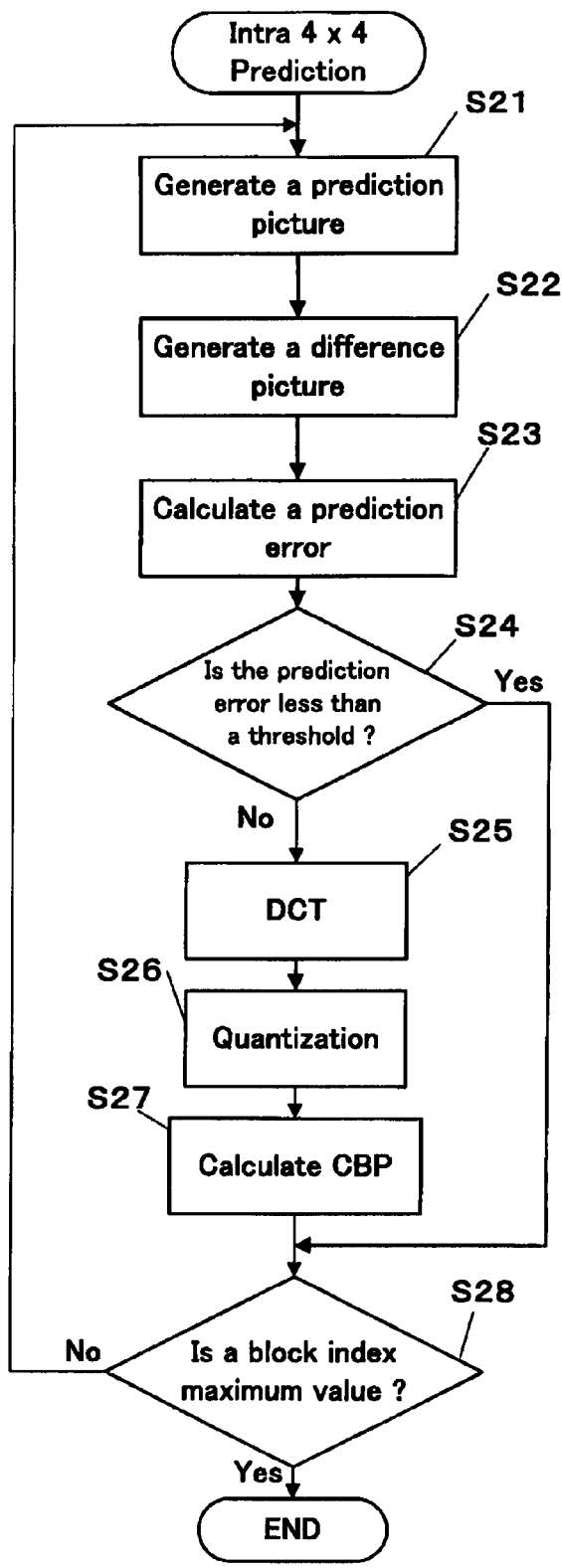
FIG. 4 shows an intra prediction processing according to the present invention.

As shown in FIG. 4, it is recognized that the mode is the intra 4×4 prediction mode, a prediction picture of a block including 4×4 pixels is generated based on the control by the control part 121 (S21). Here, the prediction picture of the block is generated by predicting based on pixels in a block existing around the block and located at the boundary position of the block (that is, using at least one block adjacent to the block to be coded).

When the generation of the predictive picture of the block is ended, the subtracting part 20 generates a difference picture by subtracting the prediction picture from the block to be coded included in the input signal (S22). When the difference picture is generated by the subtracting part 20, the control part 121 calculates an SAD value representing a predictive error from this difference picture (S23).

Subsequently, when the predictive error is obtained, the control part 121 compares this predictive error with a predetermined threshold (S24), and in the case where the predictive error is less than the threshold, the DCT process and the quantization process are not performed, and it is confirmed whether or not the block index corresponding to the block on which the processing has been performed indicates a maximum value (S28). In the case where the index indicates the maximum value, the processing is ended.

On the other hand, in the case where the block index is not the maximum value, the process returns to S21, and the processes according to S21-S28 are repeated for a next block including 4×4 pixels until the block index reaches the maximum value.

At step S24, if the predictive error is equal to or exceeds the threshold, the control part 121 controls the DCT/quantization part 21 to perform the DCT process on the block including 4×4 pixels (S25), and causes the quantization process to be performed on the coefficient obtained by this DCT process with integer precision (S26). The control part 121 calculates a CBP value based on the result of the processing performed in the DCT/quantization process part 21 (S27).

Thereafter, in a similar manner to the process described above, the control part 121 checks whether the block index according to the block on which the processing has been performed indicates a maximum value. In the case where the block index is not the maximum value, the process returns to S21, and the processes according to S21-S28 are repeated for a next block including 4×4 pixels until the block index reaches the maximum value. On the other hand, in the case where the index indicates the maximum value, the processing is ended.

When the above described processing is completed, the quantized coefficient outputted from the DCT/quantization part 21 is subjected to the variable length coding by the entropy coding part 22, and is outputted to the network or the like through the transmission part 13.

Next, the case where the control part 121 has selected the intra 16×16 prediction coding mode will be described with reference to FIG. 5.

Figure 5:
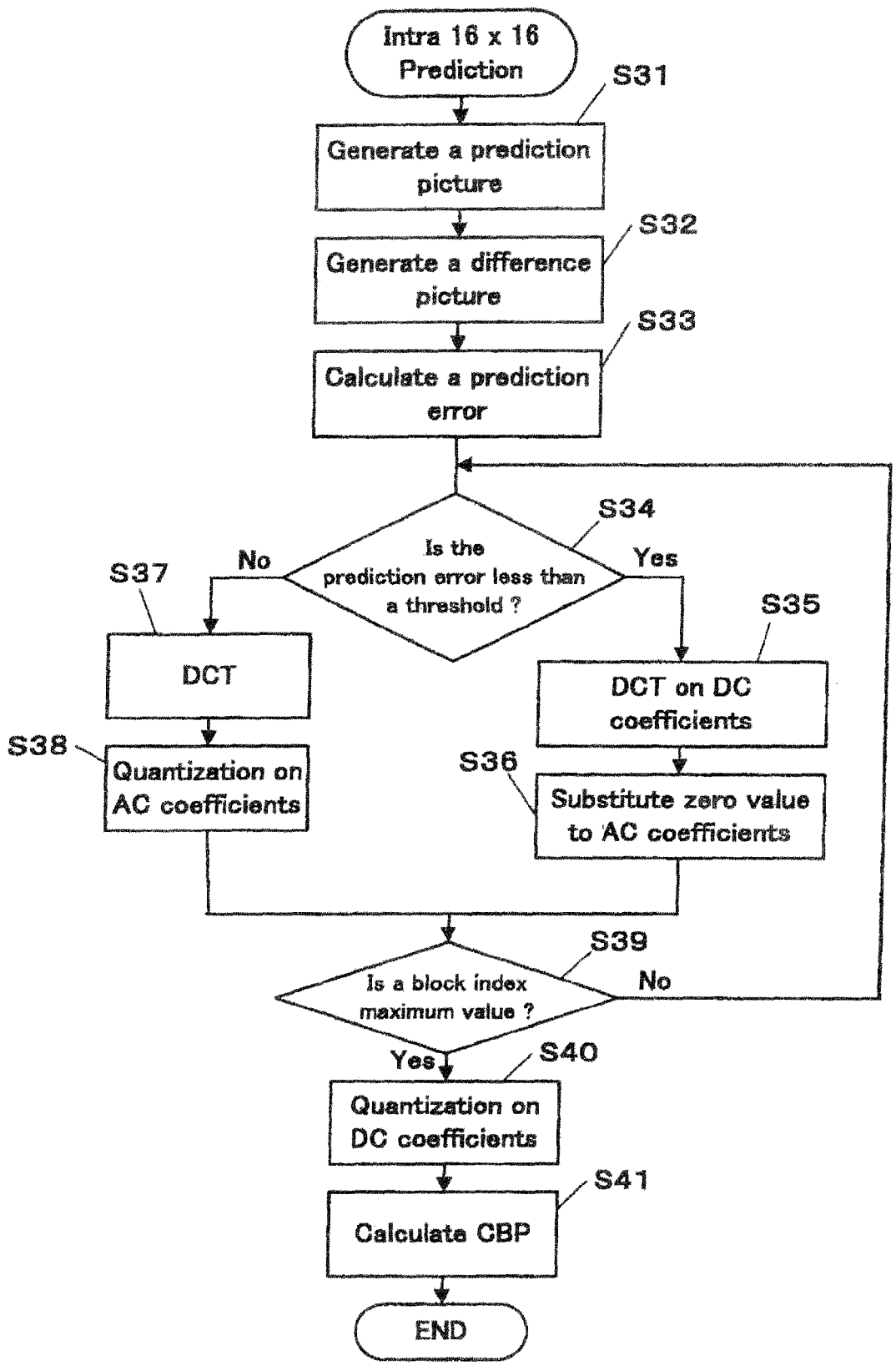
FIG. 5 shows an intra prediction processing according to the present invention.

As shown in FIG. 5, when it is recognized that the mode is the intra 16×16 prediction coding mode, based on the control by the control part 121, the intra prediction part 28 generates a prediction picture of a block including 16×16 pixels (S31). Here, similarly, the predictive picture is generated by predicting each pixel in the block to be coded by using pixels in a block existing around this block and located at the boundary position of the block (that is, using at least one block adjacent to the block to be coded).

Then, by controlling the subtracting part 20, a difference signal is obtained by subtracting the created predictive picture from the block which is obtained by dividing the input signal and which is 16×16 pixels, and a difference picture is generated (S32). When the difference picture is obtained, the control part 121 divides the difference picture including 16×16 pixels into blocks each including 4×4 pixels, and calculates an SAD value representing a predictive error in a unit of a block of 4×4 pixels (S33).

Subsequently, the control part 121 compares the calculated predictive error with a predetermined threshold (S34), and in the case where the predictive error is less than the threshold, the discrete cosine transform to obtain only a DC component is performed on the difference picture of 4×4 pixels (S35), and a zero value is substituted for an AC component (S36).

Incidentally, the above described discrete cosine transform to obtain only the DC component can be readily executed compared to the usual discrete cosine transform which obtains a DC component and an AC component.

On the other hand, in the case where the predictive error is equal to or exceeds the threshold, the DCT/quantization part 21 is controlled to perform the discrete cosine transform with integer precision on the difference picture including 4×4 pixels (S37), and the quantization process is performed on only the AC component obtained by this discrete cosine transform (S38).

When the processing of step S36 or step S38 is ended, the control part 121 confirms whether a block index indicated by the block of 4×4 pixels to be coded is a maximum value (S39). In the case where the index has not reached the maximum value, the process returns to step S34, and the same processing is performed on a next difference picture of 4×4 pixels.

In the case where the block index reaches the maximum value, the quantization process is performed on only the coefficient of the DC component (S40), and then, a CBP value is calculated and the processing is ended.

Incidentally, before the quantization process on the coefficient of the DC component is performed, an orthogonal transform such as a Hadamard transform is performed.

When the above processing is completed, the quantized coefficient outputted from the DCT/quantization part 21 is subjected to the variable length coding in the entropy coding part 22, and is outputted to the network or the like through the transmission part 13.

Next, the case where the control part 121 has selected that the coding processing is performed on a color-differential signal will be described with reference to FIG. 6.

Figure 6:
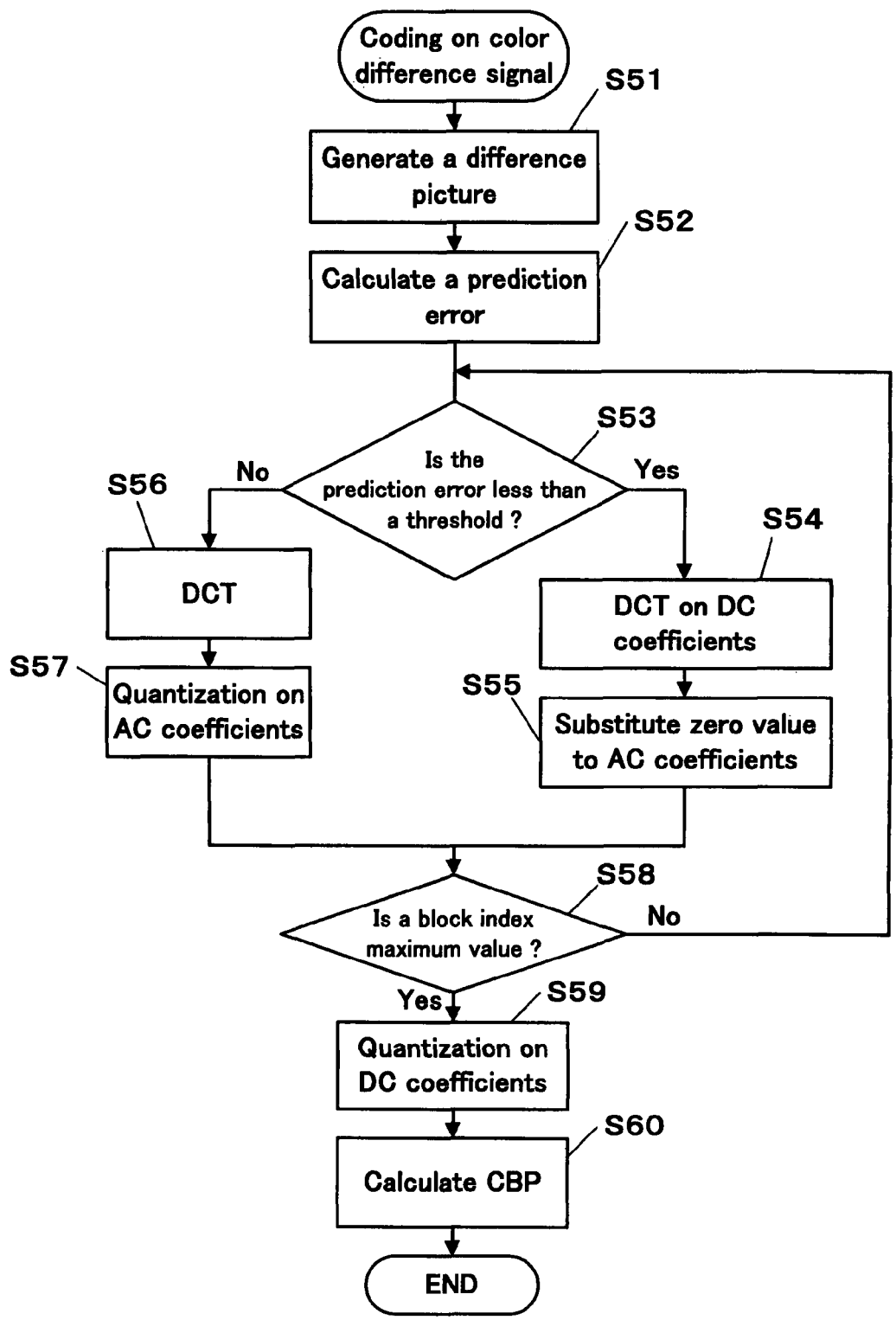
FIG. 6 shows a coding processing on a chrominance differential signal according to the present invention.

As shown in FIG. 6, when the control part 121 selects that the coding is performed on the color-differential signal, the subtracting part 20 generates a difference picture by subtracting the predictive picture which is generated by the intra prediction part 28 from a block to be coded contained in an input signal (S51). Incidentally, in the case where the color-differential signal is encoded, since it is performed in a unit of a block including 8×8 pixels, the block as the coding object includes 8×8 pixels.

When the difference picture is obtained, the control part 121 divides the difference picture into blocks each including 4×4 pixels, calculates an SAD value representing a predictive error for each of the divided blocks (S52), and compares the predictive error with a predetermined threshold (S53).

As a result of this comparison, in the case where the predictive error is less than the threshold, the discrete cosine transform to obtain only a DC component is performed on the difference picture of 4×4 pixels (S54), and a zero value is substituted for an AC component (S55).

On the other hand, in the case where the predictive error is equal to or exceeds the threshold, the DCT/quantization part 21 is controlled to perform the discrete cosine transform with integer precision on the difference picture including 4×4 pixels (S56), and the quantization process is performed only on the AC component obtained by this discrete cosine transform (S57).

When the processing of step S55 or step S57 is ended, the control part 121 confirms whether the block index corresponding to the block of 4×4 pixels to be coded is a maximum value (S58). In the case where it is not the maximum value, the process returns to step S53, and the same processing is performed on a next difference picture of 4×4 pixels.

In the case where the block index is the maximum value, the quantization processing is performed on only the coefficient of the DC component (S59), and then, a CBP value is calculated and the processing is ended.

Incidentally, before the quantization process on the coefficient of the DC component is performed, an orthogonal transform such as a Hadamard transform is performed.

When the processing is completed, the quantized coefficient outputted from the DCT/quantization part 21 is subjected to the variable length coding by the entropy coding part 22, and is outputted to the network or the like through the transmission part 13.

As stated above, the discrete cosine transform and the quantization process are changed according to the coding mode, so that the processing load in the discrete cosine transform and the quantization process can be reduced while the degradation of picture quality is suppressed.

In addition, in the intra 16×16 prediction mode and in the mode of coding the color-differential signal, since the coefficient of the direct current component is liable to remain, it is also a feature that the quantization on the coefficient of the direct current component is performed.

Incidentally, in the comparison between the predictive error and the threshold, the judgment is performed on the basis of "predictive error<threshold" as described above; however, a judgment can be performed as to whether "predictive error>threshold" instead. That is, for example, in FIG. 3 at step S13 processing proceeds to step S14 if the prediction error is greater than or equal to the threshold, while processing proceeds to step S15 if the prediction error is less than the threshold. However, at step S13 a judgment may be performed as to whether the prediction error is greater than the threshold. In this case, processing would proceed to step S14 if the prediction error were greater than the threshold, while processing would proceed to step S15 if the prediction error were less than or equal to the threshold. A similar modification could be made at steps S24, S34 and S53 in FIGS. 4, 5 and 6.

What is claimed is:

1. A communication terminal comprising:
    a coding part for coding a moving picture by selectively using one of an intra-coding mode and an inter-coding mode;
    wherein, if the intra-coding mode is used by the coding part, the coding part:
        calculates a difference signal by subtracting, from a first block to be coded which is in a first size and is divided from the moving picture, a prediction block in the first size generated using at least one block adjacent to the first block to be coded;
        divides the difference signal into a plurality of second blocks in a second size;
        calculates a prediction error from the difference signal based on the second blocks;
        compares the prediction error with a predetermined threshold; and
        calculates one of: (i) both a quantized AC component and a quantized DC component by executing a discrete cosine transform and quantization on the difference signal if the prediction error is greater than the threshold, and (ii) only a quantized DC component by executing the discrete cosine transform and quantization on the difference signal if the prediction error is less than or equal to the threshold.

2. The communication terminal according to claim 1, wherein if the prediction error is less than or equal to the threshold, the coding part substitutes a zero value for an AC component extracted by executing the discrete cosine transform so as to calculate the quantized DC component.

3. The communication terminal according to claim 1, wherein if the prediction error is less than or equal to the threshold, the coding part substitutes a zero value for an AC component extracted by executing the discrete cosine transform so as to calculate only the quantized DC component.

4. The communication terminal according to claim 1, wherein the first size is 16×16 pixels and the second size is 4×4 pixels.

5. The communication terminal according to claim 1, wherein the first size is 8×8 pixels and the second size is 4×4 pixels.

6. A communication terminal comprising:
    a coding part for coding a moving picture by selectively using one of an intra-coding mode and an inter-coding mode;
    wherein, if the intra-coding mode is used by the coding part, the coding part:
        calculates a difference signal by subtracting, from a first block to be coded which is in a first size and is divided from the moving picture, a prediction block in the first size generated using at least one block adjacent to the first block to be coded;
        divides the difference signal into a plurality of second blocks in a second size;
        calculates a prediction error from the difference signal based on the second blocks;
        compares the prediction error with a predetermined threshold; and
        calculates one of: (i) both a quantized AC component and a quantized DC component by executing a discrete cosine transform and quantization on the difference signal if the prediction error is greater than or equal to the threshold, and (ii) only a quantized DC component by executing the discrete cosine transform and quantization if the prediction error is less than the threshold.

7. The communication terminal according to claim 6, wherein if the prediction error is less than the threshold, the coding part substitutes a zero value for an AC component extracted by executing the discrete cosine transform so as to calculate the quantized DC component.

8. The communication terminal according to claim 6, wherein if the prediction error is less than the threshold, the coding part substitutes a zero value for an AC component extracted by executing the discrete cosine transform so as to calculate only the quantized DC component.

9. The communication terminal according to claim 6, wherein the first size is 16×16 pixels and the second size is 4×4 pixels.

10. The communication terminal according to claim 6, wherein the first size is 8×8 pixels and the second size is 4×4 pixels.

11. A method of controlling a coding part of a communication terminal to code a moving picture by selectively using an intra-coding mode, comprising:
    calculating a difference signal by subtracting, from a first block to be coded which is in a first size and is divided from the moving picture, a prediction block in the first size generated using at least one block adjacent to the first block to be coded;
    dividing the difference signal into a plurality of second blocks in a second size;
    calculating a prediction error from the difference signal based on the second blocks;
    comparing the prediction error with a predetermined threshold; and
    calculating one of: (i) both a quantized AC component and a quantized DC component by executing a discrete cosine transform and quantization on the difference signal if the prediction error is greater than the threshold, and (ii) only a quantized DC component by executing the discrete cosine transform and quantization on the difference signal if the prediction error is less than or equal to the threshold;
    wherein the coding part is also operable in an inter-coding mode.

12. The method according to claim 11, wherein if the prediction error is less than or equal to the threshold, a zero value is substituted for an AC component extracted by executing the discrete cosine transform so as to calculate the quantized DC component.

13. The method according to claim 11, wherein if the prediction error is less than or equal to the threshold, a zero value is substituted for an AC component extracted by executing the discrete cosine transform so as to calculate only the quantized DC component.

14. The method according to claim 11, wherein the first size is 16×16 pixels and the second size is 4×4 pixels.

15. The method according to claim 11, wherein the first size is 8×8 pixels and the second size is 4×4 pixels.

16. A method of controlling a coding part of a communication terminal to code a moving picture by selectively using an intra-coding mode, comprising:
    calculating a difference signal by subtracting, from a first block to be coded which is in a first size and is divided from the moving picture, a prediction block in the first size generated using at least one block adjacent to the first block to be coded;
    dividing the difference signal into a plurality of second blocks in a second size;
    calculating a prediction error from the difference signal based on the second blocks;
    comparing the prediction error with a predetermined threshold; and
    calculating one of: (i) both a quantized AC component and a quantized DC component by executing a discrete cosine transform and quantization on the difference signal if the prediction error is greater than or equal to the threshold, and (ii) only a quantized DC component by executing the discrete cosine transform and quantization if the prediction error is less than the threshold;
    wherein the coding part is also operable in an inter-coding mode.

17. The method according to claim 16, wherein if the prediction error is less than the threshold, a zero value is substituted for an AC component extracted by executing the discrete cosine transform so as to calculate the quantized DC component.

18. The method according to claim 16, wherein if the prediction error is less than the threshold, a zero value is substituted for an AC component extracted by executing the discrete cosine transform so as to calculate only the quantized DC component.

19. The method according to claim 16, wherein the first size is 16×16 pixels and the second size is 4×4 pixels.

20. The method according to claim 16, wherein the first size is 8×8 pixels and the second size is 4×4 pixels.

* * * * *